United States Patent
Butukuri et al.

(10) Patent No.: US 11,167,798 B1
(45) Date of Patent: Nov. 9, 2021

(54) VEHICLE ENERGY ABSORBING STRUCTURE AND TECHNIQUES

(71) Applicant: Zoox, Inc., Foster City, CA (US)

(72) Inventors: Ramanjaneya Reddy Butukuri, Union City, CA (US); Kevin Hothem, Redwood City, CA (US); Robert Alan Ng, Mountain View, CA (US); Thomas Andrew Stoddart, Mountain View, CA (US)

(73) Assignee: Zoox, Inc., Foster City, CA (US)

( * ) Notice: Subject to any disclaimer, the term of this patent is extended or adjusted under 35 U.S.C. 154(b) by 165 days.

(21) Appl. No.: 16/728,786

(22) Filed: Dec. 27, 2019

(51) Int. Cl.
| | | |
|---|---|---|
| *B60J 9/00* | (2006.01) | |
| *B62D 21/15* | (2006.01) | |
| *B62D 21/02* | (2006.01) | |
| *B60R 19/02* | (2006.01) | |
| *B60K 1/04* | (2019.01) | |

(52) U.S. Cl.
CPC ............ *B62D 21/15* (2013.01); *B62D 21/02* (2013.01); *B60K 1/04* (2013.01); *B60R 19/02* (2013.01); *B60Y 2306/01* (2013.01)

(58) Field of Classification Search
CPC ............ A63B 2208/12; A63B 2220/53; A63B 2220/801; B25D 17/24; C08L 71/123; B22F 7/08; B22F 2999/00; B22F 2005/005; B22F 2203/11; B22F 2207/15
See application file for complete search history.

(56) References Cited

U.S. PATENT DOCUMENTS

| | | | |
|---|---|---|---|
| 3,893,703 A | 7/1975 | Chika | |
| 7,416,039 B1* | 8/2008 | Anderson | B60K 6/30 180/165 |
| 8,292,232 B1 | 10/2012 | Andrews et al. | |
| 10,010,784 B1 | 7/2018 | Doerksen et al. | |
| 10,780,930 B1* | 9/2020 | Kentley-Klay | B62D 65/022 |
| 10,858,044 B2* | 12/2020 | Sawatzki | B62D 25/082 |
| 10,960,939 B1* | 3/2021 | Kentley-Klay | B62D 27/023 |
| 2005/0275181 A1 | 12/2005 | MacIsaac | |
| 2009/0127812 A1 | 5/2009 | Copsey et al. | |
| 2009/0242298 A1* | 10/2009 | Guss | B60L 50/66 180/68.5 |
| 2013/0078496 A1* | 3/2013 | Lim | H01M 10/625 429/120 |
| 2013/0248267 A1* | 9/2013 | Nitawaki | B60K 1/04 180/68.5 |
| 2017/0259811 A1* | 9/2017 | Coulter | A61G 5/1089 |
| 2018/0111501 A1* | 4/2018 | Takeuchi | H01M 50/20 |

(Continued)

*Primary Examiner* — Kiran B Patel
(74) *Attorney, Agent, or Firm* — Lee & Hayes, P.C.

(57) ABSTRACT

An impact energy absorbing system for a vehicle includes a first impact energy absorbing structure to absorb energy from an impact with an external object, and a second energy absorbing structure to absorb energy from an impact with an internal displaceable object internal. The second energy absorbing structure may be disposed between the displaceable object and a protected object internal to the vehicle. The second impact energy absorbing structure may be disposed within the vehicle and configured to protect the protected object from impact by the displaceable object being displaced toward the protected object during a collision. Additionally, the second impact energy absorbing structure may cause the displaceable object to avoid impacting and/or damaging the protected object.

20 Claims, 7 Drawing Sheets

(56) References Cited

U.S. PATENT DOCUMENTS

| | | | |
|---|---|---|---|
| 2018/0178641 A1* | 6/2018 | Yamafuji | B60K 1/04 |
| 2018/0345777 A1* | 12/2018 | Birnschein | B60W 10/18 |
| 2019/0039760 A1 | 2/2019 | Beesley et al. | |
| 2020/0031426 A1 | 1/2020 | Voss | |
| 2020/0055407 A1* | 2/2020 | Foley | B60L 50/64 |
| 2020/0086730 A1* | 3/2020 | Hara | G05D 1/021 |
| 2020/0361536 A1* | 11/2020 | Swain | B60K 7/0007 |
| 2021/0013470 A1* | 1/2021 | Goitsuka | B62D 25/20 |
| 2021/0101462 A1 | 4/2021 | Ito et al. | |
| 2021/0107331 A1 | 4/2021 | Asakura et al. | |
| 2021/0139078 A1* | 5/2021 | Peru | B62D 21/155 |
| 2021/0179179 A1* | 6/2021 | Butukuri | B62D 21/157 |

\* cited by examiner

VEHICLE ENERGY ABSORBING STRUCTURE AND TECHNIQUES

BACKGROUND

Many vehicles in operation today are designed to provide protection to a passenger from an impact with an external object. To provide protection, many vehicles use primary crash protection systems, for example, bumpers and/or airbags. While crash protection technology is improving, compact, electric, bidirectional, and/or autonomous vehicles have unique components and configurations that under certain conditions, conventional primary protection systems may be insufficient to provide protection to the vehicle, vehicle components, or passengers during a crash.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

As discussed above, conventional primary crash protection system may not be adequate to protect certain types of vehicles, and may provide insufficient protection for the vehicle, vehicle components, or passengers during a crash. For example, an electric vehicle may carry one or more large batteries that may be vulnerable to damage from other components or structures within the vehicle during a crash.

This application relates to structures and techniques for improving impact handling of vehicles, such as may be experienced during a crash. In order to mitigate damage sustained during a crash, in some examples, a vehicle may include a first energy absorbing structure to absorb energy from impact with an external object and a second impact energy absorbing structure to absorb energy from a displaceable object with the vehicle.

For example, a vehicle may include a first impact energy absorbing structure (e.g., bumper, crash rails, crumple zones, etc.) disposed at a distal end of the vehicle and configured to absorb energy from an impact with an external object. The vehicle may also include one or more protected objects internal to the vehicle. In some examples, the protected object may be a passenger compartment, a battery, fuel cell, a fuel tank, computing system, or other object susceptible to damage due to impact forces during a collision. The vehicle may also include a displaceable object disposed within an internal space of the vehicle between the first impact energy absorbing structure and the protected object. The displaceable object may be a relatively heavy, dense, and/or uncompressible object disposed in a space between the first energy absorbing structure and the protected object. By way of example and not limitation, the displaceable object may include an electric motor, a steering rack or other steering component(s), one or more suspension components, and/or a frame or support structure. During a collision, the displaceable object may be displaced toward the protected object. The vehicle may also include a second impact energy absorbing structure disposed within the internal space of the vehicle between the protected object and the displaceable object. In this example, the second impact energy absorbing structure may be configured to protect the protected object from impact by the displaceable object being displaced toward the protected object during a collision. In some examples, the second impact energy absorbing structure may additionally or alternatively be configured to deflect the displaceable object away from the protected object and/or to change a direction of motion of the displaceable object.

In some examples, such as in the case of a bidirectional vehicle, the vehicle may include primary and secondary impact energy absorbing structures disposed at both longitudinal ends of the vehicle. In such examples, the vehicle may include a first drive assembly disposed at a first longitudinal end of the vehicle which includes first and second impact energy absorbing structures, and a second drive assembly disposed at a second longitudinal end of the vehicle which includes third and fourth impact energy absorbing structures.

In some examples, a drive assembly for a vehicle (e.g., bidirectional or unidirectional vehicle) may include a first impact energy absorbing structure disposed at a distal end of the drive assembly and configured to absorb energy from an impact with an external object. The drive assembly may also include a protected object internal to the drive assembly. The drive assembly may also include a displaceable object disposed within an internal space of the drive assembly between the first impact energy absorbing structure and the protected object. The displaceable object may be displaced towards the protected object during a crash. The drive assembly may also include a second impact energy absorbing structure disposed within the internal space of the drive assembly between the protected object and the displaceable object. In the event that the displaceable object is displaced toward the protected object during a collision, the second impact energy absorbing structure is configured to absorb a portion of energy from the displaceable object, thereby protecting the protected object. In some examples, the second impact energy absorbing structure may additionally or alternatively be configured to deflect the displaceable object away from the protected object and/or to change a direction of motion of the displaceable object.

In some examples, the protected object may include one or more energy absorbing structures or systems. For instance, a system may include a battery casing with a battery disposed in the battery casing. The system may also include an impact energy absorbing structure coupled to the battery casing. The impact energy absorbing structure may include a cross-member substantially spanning a width of the battery casing. The impact energy absorbing structure may deform to absorb energy of an object impacting the system and/or deflect the object from impacting the battery. In some examples, the impact energy absorbing structure may be formed integrally with the battery casing and/or battery, or may be installed to the battery casing and/or battery prior to installation in a vehicle. In some examples, the system may be integrated into a vehicle and/or one or more drive assemblies. This disclosure discusses certain structures and techniques to solve some or all of the deficiencies caused by limiting protection of a vehicle to a primary crash system.

Figure 1:
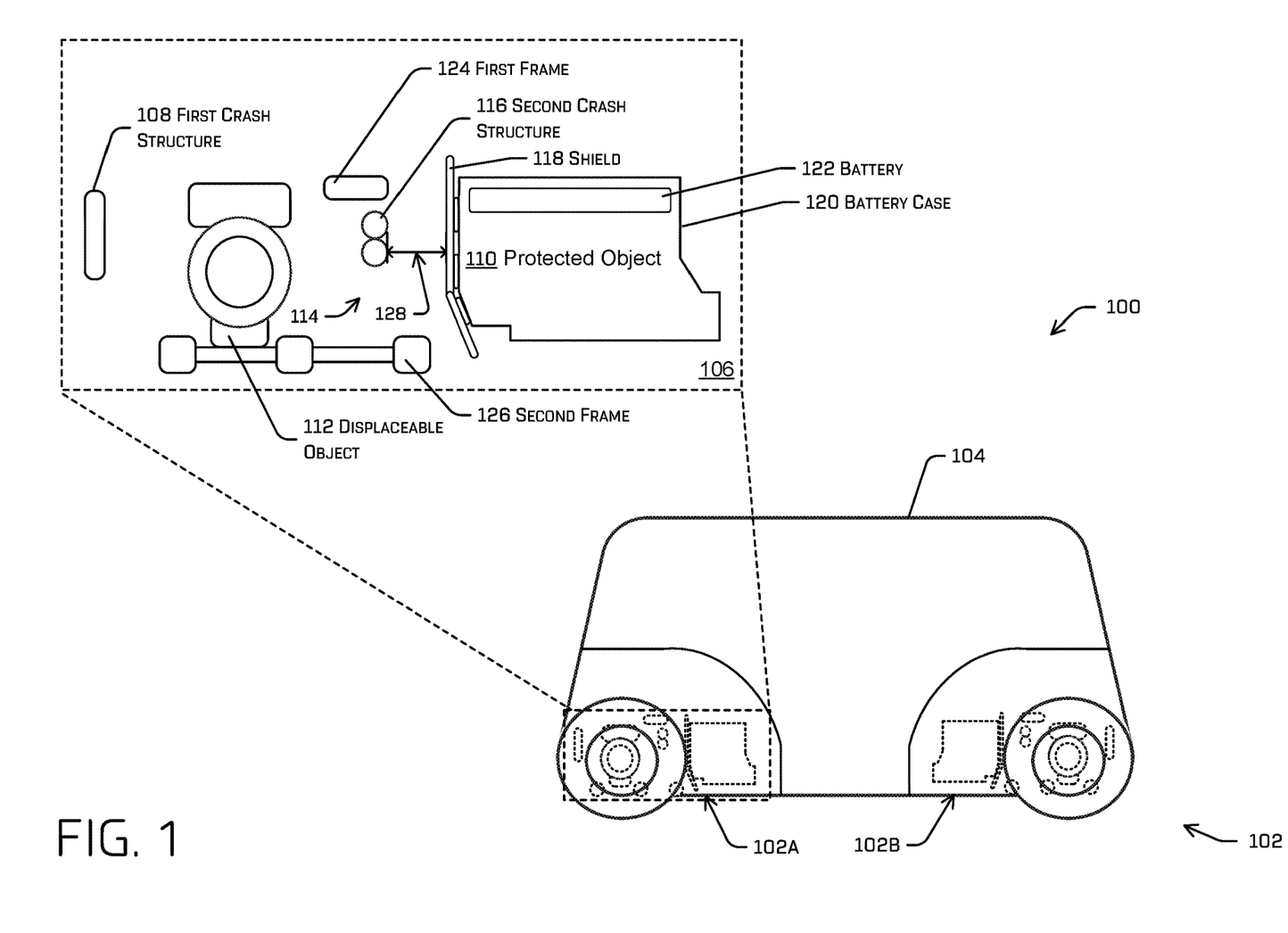
FIG. 1 is an illustration of an example vehicle having one or more drive assemblies configured with impact energy absorbing structures to protect objects within the autonomous vehicle, in accordance with examples of the disclosure.

FIG. 1 is an illustration of an example vehicle 100 having one or more drive assemblies configured with impact energy absorbing structure systems to protect objects within the autonomous vehicle, in accordance with examples of the disclosure. The vehicle shown in FIG. 1 is a bidirectional autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle may be a fully or partially autonomous vehicle having any other level or classification. Moreover, in some instances, the energy absorbing structures described herein may be applicable to non-autonomous and/or non-bidirectional vehicles as well. Also, while examples are given in which the vehicle is a land vehicle, the techniques described herein are also applicable to aerial, marine, and other vehicles.

In the illustrated example, the vehicle 100 includes a first drive assembly 102A and a second drive assembly 102B (collectively "drive assemblies 102") coupled to a body 104. Each of the drive assemblies 102 in this example includes multiple vehicle systems and may include systems or structures to protect those systems. For example, the first drive assembly 102A includes a protection system 106. The protection system 106 includes a first crash structure 108, a protected object 110, a displaceable object 112, and an internal crash structure 114.

In some examples, the internal crash structure 114 includes a second crash structure 116, for example, a cross beam/cross member and a shield 118. In some examples, the shield 118 may be attached to a battery case 120 that may hold a battery 122. In some examples, the coupling of the shield 118 to the battery case 120 may provide additional structural support to the shield 118 thereby reducing the amount of shield material required to maintain a level of strength and/or stiffness. In some examples, the second crash structure 116 may be coupled to the battery case 120 and/or a first frame 124 or second frame 126 of the first drive assembly 102A. In some examples, a portion of the second crash structure 116 is spaced a distance from the protected object 110 creating a gap 128 between the second crash structure 116 and the protected object 110. In some examples, the second crash structure 116 deforms into the gap 128 in response to the displaceable object 112 impacting the second crash structure 116. In this example, the deformation of the second crash structure 116 includes a plastic deformation of the second crash structure 116 thereby absorbing energy from the displaceable object 112.

Additionally or alternatively, the second crash structure 116 may deflect the displaceable object 112 to cause the displaceable object 112 to change directions and/or move away from the protected object. In some examples, the deflection may be sufficient to cause the displaceable object 112 to avoid impacting the protected object 110. For example, the second crash structure 116 may be disposed closer to a first end (e.g., top end) of the displaceable object 112 than to a second end (e.g., bottom end) of the displaceable object 112. In that case, when the displaceable object 112 is displaced toward the protected object 110, the second crash structure 116 is positioned to impart a torque to the displaceable object 112 sufficient to cause the displaceable object 112 to rotate (e.g., in the counter clockwise direction as better shown in FIG. 3), to slow rotation, to stop rotation, to change rotation, or combinations thereof.

In some examples, the first drive assembly 102A includes the first frame 124 coupled to the first crash structure 108. In some examples, the first frame 124 is coupled to the protected object 110. In some examples, the first frame 124 is coupled to the internal crash structure 114. Additionally or alternatively, in some embodiments, the first drive assembly 102A includes the second frame 126 coupled to the displaceable object 112. In some examples, the second frame 126 is selectively coupled to the first frame 124.

In some examples, the first crash structure 108 comprises an impact energy absorbing structure, for example, a bumper, that is configured to receive and absorb energy from an impact with an external object. The first crash structure 108 may be configured to absorb energy from the impact, for example, by plastically deforming portions of the first crash structure 108 and/or first frame 124. In these examples, the impact energy absorbing structure may include one or more crumple zones, deformation or bend intimating structures, or other energy absorbing structures.

In some examples, the protected object 110 may include the battery 122, fuel cell, fuel tank, or other energy storage system, a passenger compartment, cabin, or cargo area of the vehicle, a computing system of the vehicle, or any other system of the vehicle that is to be protected and is susceptible to damage during a collision. In some examples, the protected object 110 may be enclosed within the battery case 120 or other protective housing. In some examples, the protected object 110 may be enclosed within the body 104 of the vehicle 100.

In some examples, the displaceable object 112, includes a motor, a drive system, a steering system, a control system, a hydraulic system, and/or a suspension system, a frame or structural component, or portions or combinations thereof. In some examples, the displaceable object 112 may include any object within the drive assembly 102 that is likely to cause damage to the protected object 110 during an impact with an external object. In some examples, the displaceable object 112 may be an object that is relatively heavy, dense, and/or uncompressible/undeformable. In some examples, the displaceable object 112 may be propelled towards the protected object 110 by energy received from the impact. In some examples, the energy may be transferred to the displaceable object 112 directly, for example, if the external object directly impacts the displaceable object 112, or indirectly, for example, if the first crash structure 108 transmits energy absorbed from the impact to the displaceable object 112, for example directly to or through the first frame 124 and/or second frame 126.

Additionally or alternatively, in some examples, the drive assemblies 102 may include cooling systems, a propulsion system of the vehicle, a steering system, a braking system, a suspension system, related controls and actuators for the forgoing systems, electronics related to supplying power from the one or more batteries to one or more other components or systems of the drive assemblies 102 and/or the body 104. In some examples, the drive assemblies 102 may also include exterior lighting, body panels, facia, and/or sensors.

In some examples, the first frame 124 and/or the second frame 126 may include a metal material (e.g., aluminum, steel, titanium, etc.), a plastic material (e.g., polymer, etc.), a composite material (e.g., fiberglass, carbon fiber, Kevlar, etc.), or a combination thereof. For example, the material may plastically deform to absorb energy.

In some examples, the battery 122 may be coupled to the battery case 120. The battery case 120 may include a metal material (e.g., aluminum, steel, titanium, etc.), a plastic material (e.g., polymer, etc.), a ceramic material, a composite material (e.g., fiberglass, carbon fiber, Kevlar, etc.), or a combination thereof. In at least one example, the battery case 120 may include a metal material, formed via an extrusion process. In some examples, the battery case 120 may be configured to envelope the battery 122 on all sides. As discussed above, the shield 118 may be attached to the battery case 120 on at least one side and may provide additional protection to the battery 122. In some examples, the shield 118 may be formed integrally with the battery case 120 (e.g., a wall of the battery case 120 may have a thicker wall thickness than other portions of the battery case 120). In some examples, the shield 118 and/or the battery case 120 may be made of a material that has a higher strength and/or rigidity than the second crash structure 116. In other words, in some examples, the second crash structure 116 has a first rigidity which is lower than a second rigidity of the shield 118 and/or battery case 120. In that case, the second crash structure 116 is configured to deform to a greater degree when impacted by the displaceable object 112 than the shield 118.

In some examples, the battery case 120 may be configured to couple to the first frame 124. In examples where the battery case 120 is coupled to the first frame 124, the battery case 120 may be configured to transfer energy received from the displaceable object 112 through the second crash structure 116 to the battery case 120 and to the first frame 124. This transfer may be facilitated through fixed joints, comprising, for example, fasteners, molded connections, among others, and/or reaction surfaces. For example, energy from the displaceable object 112 may be transferred to the second crash structure 116 through a reaction surface on the second crash structure 116 being impacted by a surface of the displaceable object 112. Energy may be transferred from the second crash structure 116 to laterally outboard edges of the battery case 120 and/or shield 118 through fasteners connecting the second crash structure 116 to the battery case 120. Energy may be transferred from the battery case 120 to the first frame 124 through fasteners and/or a reaction surface.

Figure 2:
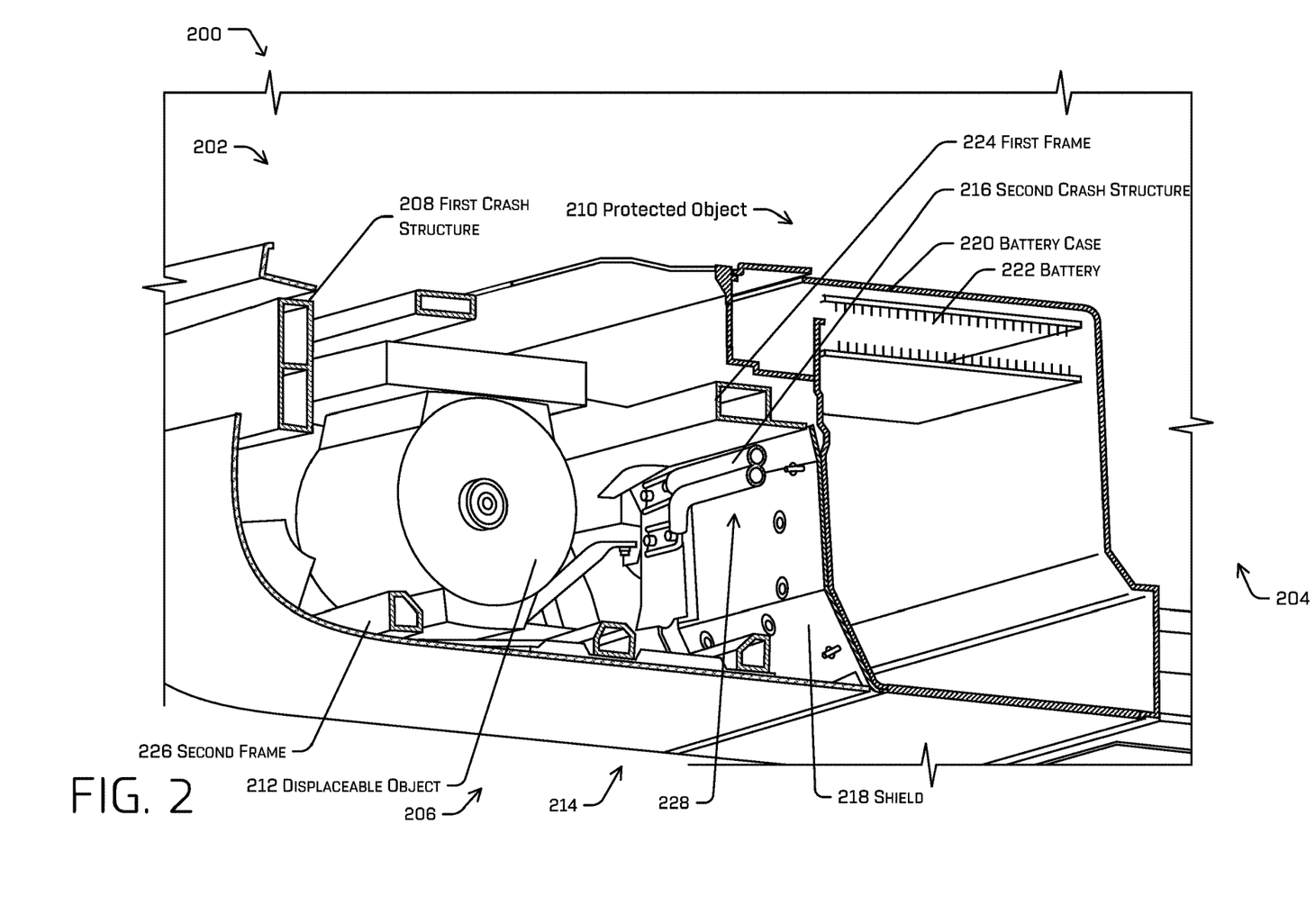
FIG. 2 is an illustration of another example vehicle having one or more drive assemblies configured with impact energy absorbing structures to protect objects within the autonomous vehicle, in accordance with examples of the disclosure.

FIG. 2 is an illustration of another example vehicle 200 having one or more drive assemblies configured with impact energy absorbing structures to protect objects within the vehicle 200, in accordance with examples of the disclosure.

In the illustrated example, the vehicle 200 includes a drive assembly 202 coupled to a body 204. The drive assembly 202 in this example includes multiple vehicle systems and may include other systems and structures to protect some of those systems. For example, the drive assembly 202 includes a protection system 206. The protection system 206 includes a first crash structure 208, a protected object 210, a displaceable object 212, and an internal crash structure 214. In this example, the displaceable object 212 is shown as an electric motor with an inverter coupled to the top thereof. However, as discussed above, the displaceable object 212 may additionally or alternatively include other components or structures that are displaceable during a collision toward one or more protected objects.

In some examples, the internal crash structure 214 includes a second crash structure 216, for example, a cross beam/cross member, and may include a shield 218. In some examples, the shield 218 may be attached to a battery case 220 that may hold a battery 222. In some examples, the second crash structure 216 may be coupled to the battery case 220 and/or a first frame 224 or second frame 226 of the drive assembly 202 at laterally outboard edges thereof. In some examples, a portion of the second crash structure 216 is spaced a distance from the protected object 210 creating a gap 228 between the second crash structure 216 and the protected object 210. In some examples, the shield 218 may be relatively more rigid than the second crash structure 216 so as to resist deformation. Thus, during a collision, the second crash structure 216 may be configured to absorb energy of the displaceable object 212 by deforming into the gap 228. In the event that the collision is of sufficient force to deform the second crash structure 216 the full distance of the gap 228, the shield 218 is configured to resist deformation and to deflect the displaceable object 212 downward to protect the protected object 210 from damage due to intrusion by displaceable object 212 or other objects.

In some examples, the drive assembly 202 includes the first frame 224 coupled to the first crash structure 208. In some examples, the first frame 224 is coupled to the protected object 210. In some examples, the first frame 224 is coupled to the internal crash structure 214. Additionally or alternatively, in some embodiments, the drive assembly 202 includes the second frame 226 coupled to the displaceable object 212. In some examples, the second frame 226 is selectively coupled to the first frame 224.

Figure 3:
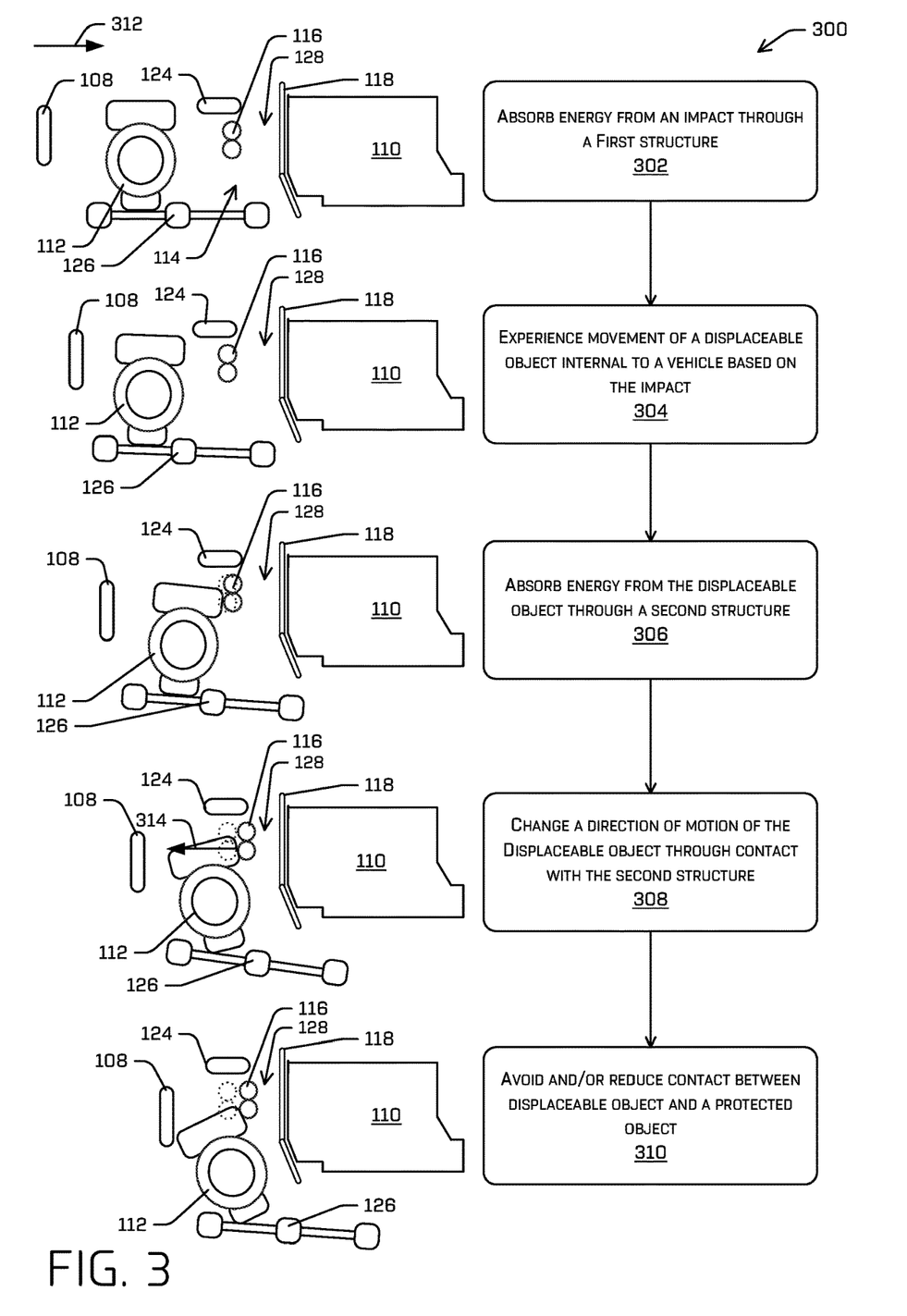
FIG. 3 is an illustration of a process and technique to absorb energy from an impact through first and second crash structures in accordance with the vehicle of FIG. 1.

FIG. 3 is a simplified schematic illustration of a process and technique to absorb energy from an impact through a second crash structure. For example, FIG. 3 shows several schematic views of drive assembly 102A of FIG. 1 as the drive assembly 102A impacts an external object and responds to the impact. For example, FIG. 3 depicts an example process 300 of mitigating an impact with an external object. At operation 302, a first crash structure, for example, first crash structure 108 absorbs energy from the impact. In some examples, the first crash structure 108 may be displaced towards and may deform into an interior of the vehicle, for example, in the direction of arrow 312.

At operation 304, the impact may cause a displaceable object, for displaceable object 112, to move within the vehicle. For example, the displaceable object 112 may move towards a protected object, for example, protected object 110. If the displaceable object 112 were allowed to follow a path caused by the impact, the displaceable object 112 might impact the protected object 110 causing damage to the protected object 110. Thus, the examples described herein include a second crash structure, for example, second crash structure 116, disposed between the displaceable object 112 and the protected object 110 to protect the protected object 110.

At operation 306, the displaceable object 112 may impact the second crash structure 116 and cause a portion of the second crash structure 116 to deform absorbing energy from the displaceable object 112. In some examples, the second crash structure 116 may be spaced from the protected object 110, to form a gap, for example, gap 128. In this example, the second crash structure 116 may deform into the gap 128. This deformation may be a plastic deformation and may absorb energy from the displaceable object 112.

At operation 308, the second crash structure 116 may also provide a reaction surface that may cause the displaceable object to be deflected in a certain direction. For example, the second crash structure may impact a first end of the displaceable object 112, for example a top of displaceable object 112, in the direction of arrow 314, and may cause the displaceable object 112 to experience a torque about an axis of the displaceable object 112. In some examples, the torque is large enough to cause the first end of the displaceable object 112 to slow a rotation towards the second crash structure 116, to stop a rotation towards the second crash structure 116, or to rotate away from the second crash structure 116. In some examples, a second end of the displaceable object 112, for example, a bottom, may be coupled to a second frame, for example second frame 126. In some examples, the second frame 126 may be displaced down, away from, and/or below the protected object 110. In some examples the movement of the second frame 126 may aid the second crash structure 116 in causing the displaceable object 112 to avoid impacting the protected object 110 during a crash.

At operation 310, the energy absorbed from and imparted to the displaceable object 112 by the second crash structure 116 causes the displaceable object 112 to avoid and/or reduce contact between the displaceable object 112 and the protected object 110 during a crash. For example, the second crash structure 116 at operations 306 and 308 may be sufficient to cause the displaceable object 112 to change a path, a speed, and/or a rotation sufficient to keep from damaging or mitigate damage to the protected object 110.

Example Second Crash Structures

Figure 4A:
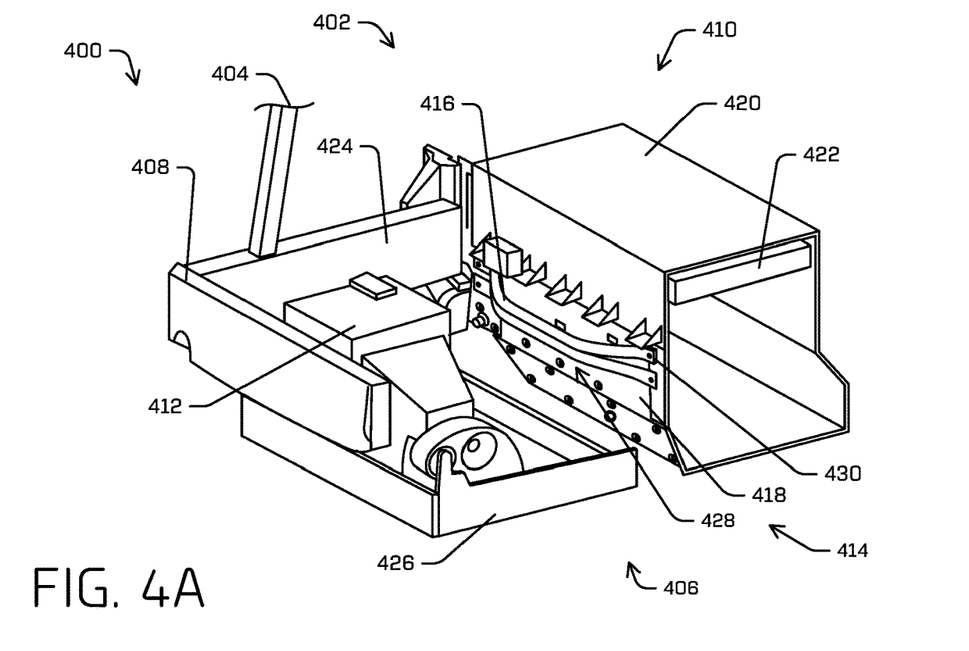
FIGS. 4A and 4B show an example system with impact energy absorbing structures to protect objects within a vehicle.
Figure 4B:
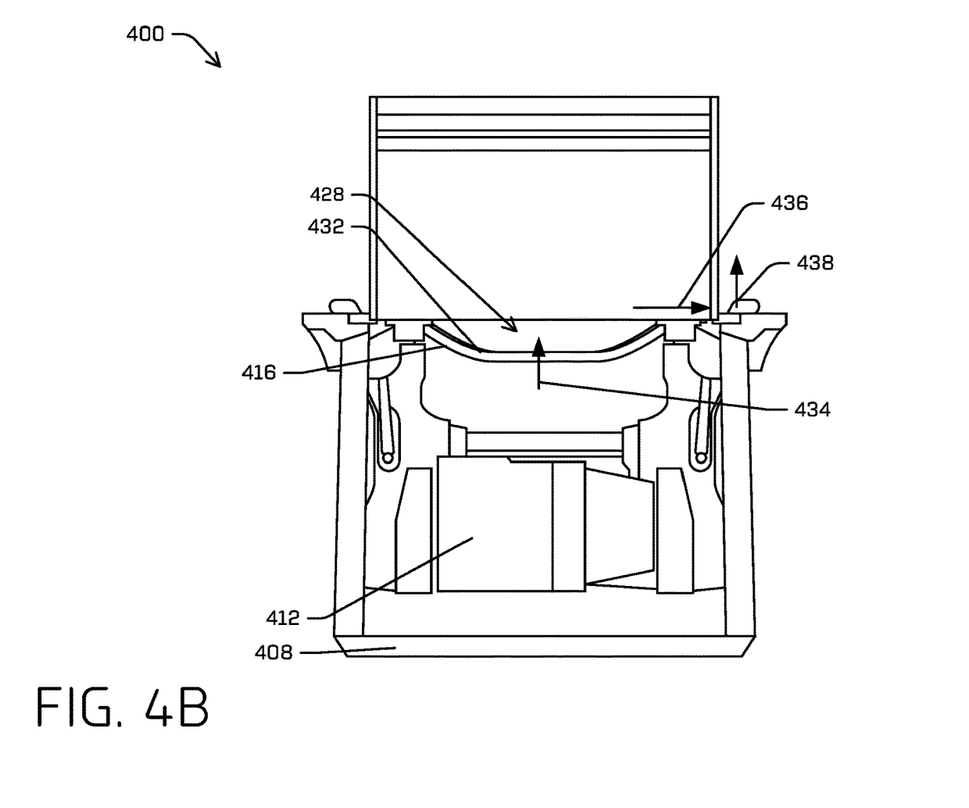

FIGS. 4A and 4B show an example system 400 including impact absorbing crash structures. For example, FIG. 4A shows a perspective cutaway view of the system 400 having a drive assembly configured with impact energy absorbing structure systems to protect objects within the autonomous vehicle, in accordance with examples of the disclosure.

In the illustrated example, the system 400 includes a drive assembly 402 coupled to a body 404. The drive assembly 402 in this example includes multiple vehicle systems and may include other systems and structures to protect some of those systems. For example, the drive assembly 402 includes a protection system 406. The protection system 406 includes a first crash structure 408, a protected object 410, a displaceable object 412, and an internal crash structure 414.

In some examples, the internal crash structure 414 includes a second crash structure 416, for example, a cross beam/cross member, and may include a shield 418. In some examples, the shield 418 may be attached to a battery case 420 that may hold a battery 422. In some examples, the second crash structure 416 may be coupled to the battery case 420 and/or a first frame 424 or second frame 426 of the drive assembly 402. In some examples, a portion of the second crash structure 416 is spaced a distance from the protected object 410 creating a gap 428 between the second crash structure 416 and the protected object 410.

In some examples, the drive assembly 402 includes the first frame 424 coupled to the first crash structure 408. In some examples, the first frame 424 is coupled to the protected object 410. In some examples, the first frame 424 is coupled to the internal crash structure 414. Additionally or alternatively, in some embodiments, the drive assembly 402 includes the second frame 426 coupled to the displaceable object 412. In some examples, the second frame 426 is coupled to the first frame 424. In some examples, the second frame 426 may be configured to detach and translate downward (e.g., below the first frame 424) during a collision.

In some examples, the second crash structure 416 may be coupled to the battery case 420. In this example, the second crash structure 416 is coupled to the battery case 420 at lateral edges of the second crash structure 416 with fasteners 430. In some examples, the connection between the battery case 420 and the second crash structure 416 may be configured to place a load on the fasteners 430. In other examples, the second crash structure 416 may be coupled to the battery case 420, the first frame 424, and/or other structures using other means (e.g., brackets, welding, etc.).

FIG. 4B shows a top down view of system 400. In this example, the second crash structure 416 may have a central portion 432 that is convex outward from the protected object 410 forming the gap 428 between the central portion 432 and the protected object 410.

In this example configuration, the displaceable object 412 may be displaced towards the second crash structure 416 causing second crash structure 416 to deform into the gap 428 in the direction of arrow 434. In this configuration, energy from the impact with the displaceable object 412 may be transferred from the second crash structure 416 to the lateral edges of the battery case 420 and/or the first frame 424. For example, the transfer of energy may include lateral and longitudinal components in the direction of arrow 436 and arrow 438, respectively.

In some examples, the transfer of energy may be pass through the fasteners 430. In some examples, the fasteners 430 may be placed in shear, in tension, in compression, or combinations thereof. For example, the fasteners 430 may be placed in a superposition state of tension and sheer. In some examples, this may be caused by the convex shape of the second crash structure 416 and movement of or force applied in the second crash structure 416 in the direction of arrow 434 and in the direction of arrow 436. This may cause a lever to be formed local to the fasteners 430 causing a force to be applied to the fasteners 430 in a direction with arrow 436 and a direction opposite of arrow 438. In some examples, the shape of second crash structure 416 may allow the fasteners 430 to be in a combined sheer and tension loading condition that thereby enabling fasteners 430 to withstand a greater load on the second crash structure 416 than would be possible if the fasteners 430 bore the impact load in either sheer or tension alone.

Additionally or alternatively, in some examples, the central portion 432 of the second crash structure 416 may be spaced from the protected object 410 and/or shield 418 by a distance sufficient to absorb an anticipated impact from the displaceable object 412. The distance may vary depending on, among other things, a mass of the displaceable object 412, the nature of the protectable object (e.g., battery, passenger compartment, etc.), the anticipated speed of collision, other crash structures included in the vehicle, etc. In the example of FIG. 4, the central portion 432 may be spaced from the protected object 410 and/or shield 418 by about 50 mm to about 150 mm. In some examples, the central portion 432 may be spaced from the protected object 410 and/or shield 418 by about 25 mm to about 300 mm. However, in other examples, the central portion 432 may be spaced from the protected object 410 and/or shield 418 by a shorter or longer distance.

Additionally or alternatively, in some examples, the second crash structure 416 may be formed using various techniques and/or materials. For example, the second crash structure 416 may comprise one or more tubular structures having circular, square, rectangular, or other cross-sectional shapes. For example, the second crash structure 416 may be formed from one or more tubes bent into the shape shown in FIGS. 4A and 4B, such that opposite ends of the tubes are coupled lateral outer edges of the battery case 420 by fasteners 430 or other fastening means, while the central portion 432 of the second crash structure 416 is spaced a distance from the battery case 420. While two tubes are shown in this example any other number of tubes (e.g., one, three, four, five, etc.) may be used to form tubular crash structures according to this example embodiment.

In some examples, the second crash structure 416 may be formed as symmetrical or asymmetrical with respect to the width and/or height of the system 400. For example, the FIG. 4B shows the second crash structure 416 as symmetrical with respect to the width of the system 400.

Figure 5A:
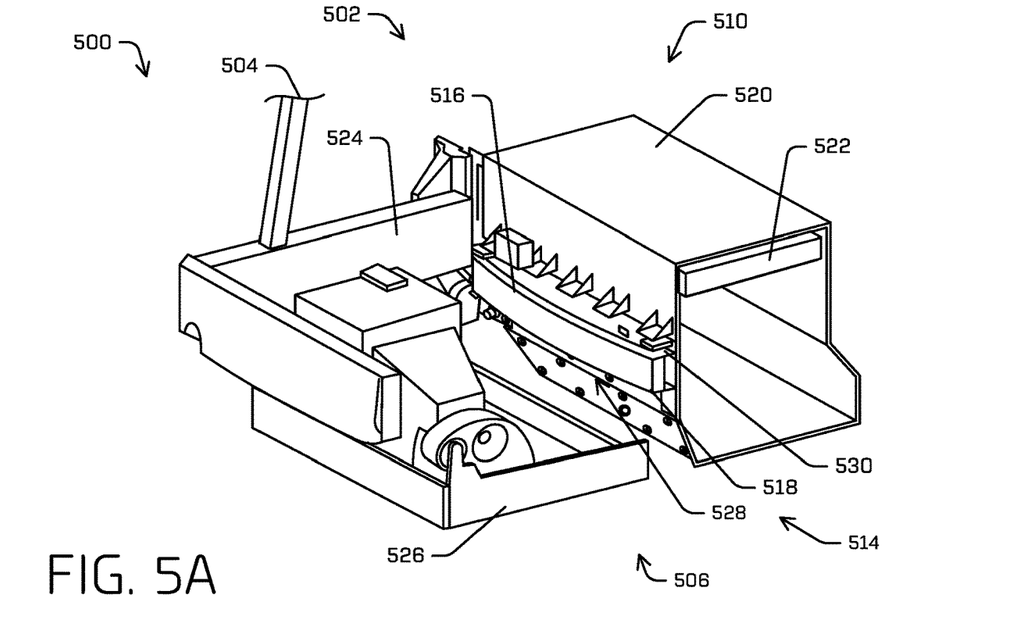
FIGS. 5A and 5B show another example system with impact energy absorbing structures to protect objects within a vehicle.
Figure 5B:
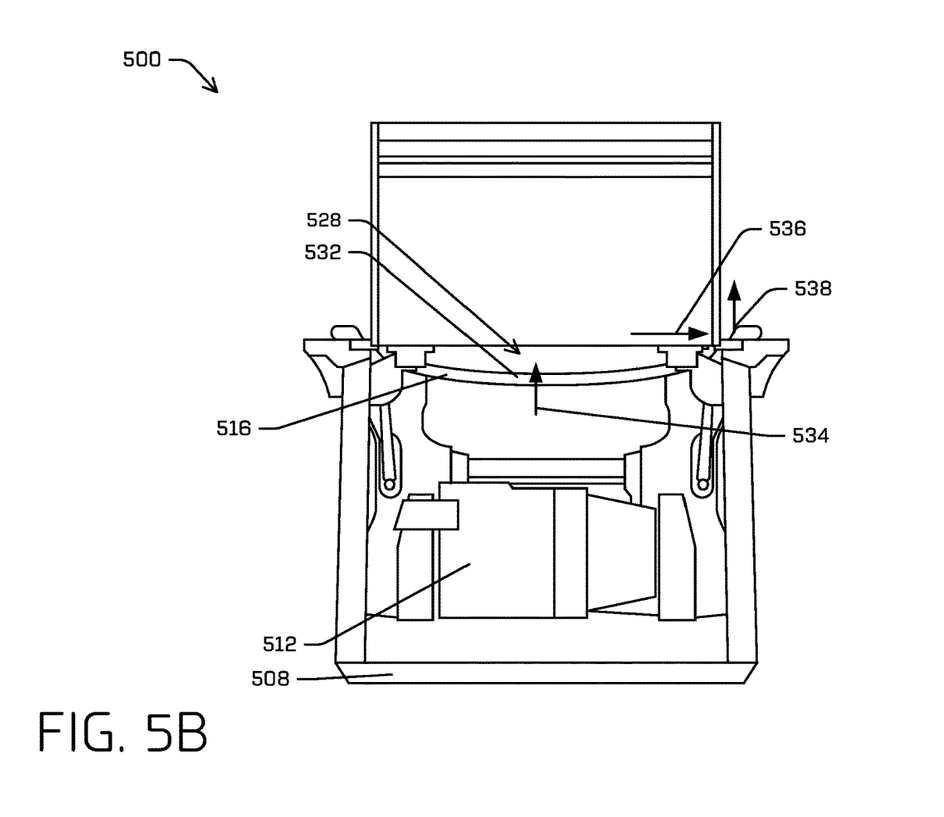

FIGS. 5A and 5B show another illustrative system 500. For example, FIG. 5A shows a perspective cutaway view of the system 500 having a drive assembly configured with impact energy absorbing structure systems to protect objects within the autonomous vehicle, in accordance with examples of the disclosure. In some examples, system 500 may share similar features and functionality as system 400.

In the illustrated example, the system 500 includes a drive assembly 502 coupled to a body 504. The drive assembly 502 in this example includes multiple vehicle systems and may include other systems and structures to protect some of those systems. For example, the drive assembly 502 includes a protection system 506. The protection system 506 includes a first crash structure 508, a protected object 510, a displaceable object 512, and an internal crash structure 514.

In some examples, the internal crash structure 514 includes a second crash structure 516, for example, a cross beam/cross member, and may include a shield 518. In some examples, the shield 518 may be attached to a battery case 520 that may hold a battery 522. In some examples, the second crash structure 516 may be coupled to the battery case 520 and/or a first frame 524 or second frame 526 of the drive assembly 502. In some examples, a portion of the second crash structure 516 is spaced a distance from the protected object 510 creating a gap 528 between the second crash structure 516 and the protected object 510.

In some examples, the drive assembly 502 includes the first frame 524 coupled to the first crash structure 508. In some examples, the first frame 524 is coupled to the protected object 510. In some examples, the first frame 524 is coupled to the internal crash structure 514. Additionally or alternatively, in some embodiments, the drive assembly 502 includes the second frame 526 coupled to the displaceable object 512. In some examples, the second frame 526 is coupled to the first frame 524. In some examples, the second frame 526 may be configured to detach and translate downward (e.g., below the first frame 524) during a collision.

In some examples, the second crash structure 516 may be coupled to the battery case 520. In this example, the second crash structure 516 is coupled to the battery case 520 at lateral edges of the second crash structure 516 with fasteners 530. In some examples, the connection between the battery case 520 and the second crash structure 516 may be configured to place a load on the fasteners 530. In other examples, the second crash structure 516 may be coupled to the battery case 520, the first frame 524, and/or other structures using other means (e.g., brackets, welding, etc.).

FIG. 5B shows a top down view of system 500. In this example, the second crash structure 516 may have a central portion 532 that is convex outward from the protected object 510 forming the gap 528 between the central portion 532 and the protected object 510.

In this example configuration, the displaceable object 512 may be displaced towards the second crash structure 516 causing second crash structure 516 to deform into the gap 528 in the direction of arrow 534. In this configuration energy from the impact with the displaceable object 512 may be transferred from the second crash structure 516 to the lateral edges of the battery case 520 and/or the first frame 524. For example, the transfer of energy may include lateral and longitudinal components in the direction of arrow 536 and arrow 538, respectively.

In some examples, the transfer of energy may be pass through the fasteners 530. In some examples, the fasteners 530 may be placed in shear, in tension, in compression, or combinations thereof, similar to the discussion above with reference to FIGS. 4A and 4B.

Additionally or alternatively, in some examples, the central portion 532 of the second crash structure 516 may be spaced from the protected object 510 and/or shield 518 by a distance sufficient to absorb an anticipated impact from the displaceable object 512. As discussed above, the distance may vary depending on, among other things, a mass of the displaceable object, the nature of the protectable object (e.g., battery, passenger compartment, etc.), the anticipated speed of collision, other crash structures included in the vehicle, etc. The distance between the central portion 532 and the protected object 510 and/or shield 518 may be any of the distances described above with reference to FIGS. 4A and 4B.

The second crash structure 516 may be formed using various techniques and/or materials. For example, the second crash structure 516 may be formed from extruded material having any open or closed cross-sectional shape. For example, the second crash structure 516 may have a C-shaped cross section, an I-shaped cross section, an L-shaped cross section, a box shaped cross-section, or the like. In some examples, the second crash structure 516 may be curved or bent into the shown configuration. In some examples the second crash structure may have a curved radius of between about 1000 mm and about 2500 mm, in some examples between about 1500 mm to about 2000 mm and, in one particular example a curved radius of about 1800 mm. However, in other examples, the second crash structure 516 may have a radius greater or smaller than these example ranges. The second crash structure 516 may be coupled at opposite ends to lateral outer edges of the battery case 520 and/or first frame 524, while the central portion 532 of the second crash structure 516 is spaced a distance from the battery case 520. In some examples the radius may be created by bending and/or roll forming the box-shaped material.

In some examples, the second crash structure 516 may be formed as symmetrical or asymmetrical with respect to the width and/or height of the system 500. For example, the FIG. 5B shows the second crash structure 516 as symmetrical with respect to the width of the system 500.

Figure 6A:
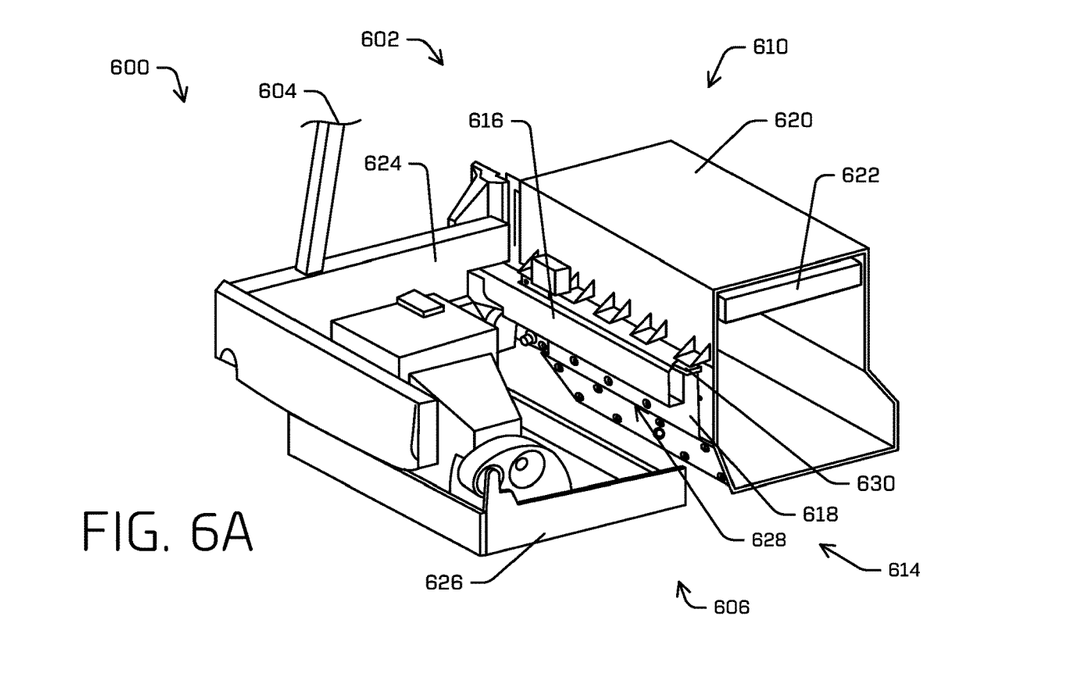
FIGS. 6A and 6B show another example system with impact energy absorbing structures to protect objects within a vehicle.
Figure 6B:
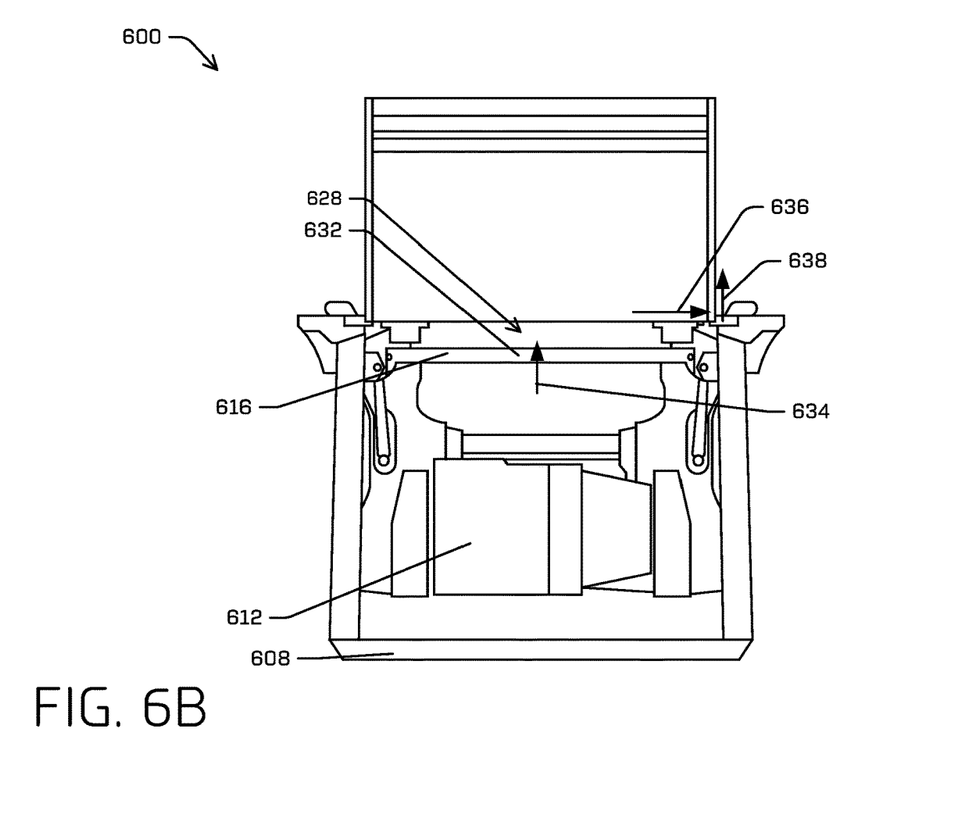

FIGS. 6A and 6B show another illustrative system 600. For example, FIG. 6A shows a perspective cutaway view of the system 600 having a drive assembly configured with impact energy absorbing structure systems to protect objects within the autonomous vehicle, in accordance with examples of the disclosure. In some examples, system 600 may share similar features and functionality as system 400.

In the illustrated example, the system 600 includes a drive assembly 602 coupled to a body 604. The drive assembly 602 in this example includes multiple vehicle systems and may include other systems and structures to protect some of those systems. For example, the drive assembly 602 includes a protection system 606. The protection system 606 includes a first crash structure 608, a protected object 610, a displaceable object 612, and an internal crash structure 614.

In some examples, the internal crash structure 614 includes a second crash structure 616, for example, a cross beam/cross member, and may include a shield 618. In some examples, the shield 618 may be attached to a battery case 620 that may hold a battery 622. In some examples, the second crash structure 616 may be coupled to the battery case 620 and/or a first frame 624 or second frame 626 of the drive assembly 602. In some examples, a portion of the second crash structure 616 is spaced a distance from the protected object 610 creating a gap 628 between the second crash structure 616 and the protected object 610.

In some examples, the drive assembly 602 includes the first frame 624 coupled to the first crash structure 608. In some examples, the first frame 624 is coupled to the protected object 610. In some examples, the first frame 624 is coupled to the internal crash structure 614. Additionally or alternatively, in some embodiments, the drive assembly 602 includes the second frame 626 coupled to the displaceable object 612. In some examples, the second frame 626 is coupled to the first frame 624. In some examples, the second frame 626 may be configured to detach and translate downward (e.g., below the first frame 624) during a collision.

In some examples, the second crash structure 616 may be coupled to the battery case 620. In this example, the second crash structure 616 is coupled to the battery case 620 at lateral edges of the second crash structure 616 with fasteners 630. In some examples, the connection between the battery case 620 and the second crash structure 616 may be configured to place a load on the fasteners 630. In other examples, the second crash structure 616 may be coupled to the battery case 620, the first frame 624, and/or other structures using other means (e.g., brackets, welding, etc.).

FIG. 6B shows a top down view of system 600. In this example, the second crash structure 616 may have a central portion 632 that is spaced from the protected object 610 forming the gap 628 between the central portion 632 and the protected object 610.

In this example configuration, the displaceable object 612 may be displaced towards the second crash structure 616 causing second crash structure 616 to deform into the gap 628 in the direction of arrow 634. In this configuration energy from the impact with the displaceable object 612 may be transferred from the second crash structure 616 to the lateral edges and to the battery case 620 and/or the first frame 624. For example, the transfer of energy may include lateral and longitudinal components in the direction of arrow 636 and arrow 638, respectively.

In some examples, the transfer of energy may be pass through the fasteners 630. In some examples, the fasteners 630 may be placed in shear, in tension, in compression, or combinations thereof, similar to the discussion above with reference to FIGS. 4A and 4B.

Additionally or alternatively, in some examples, the central portion 632 of the second crash structure 616 may be spaced from the protected object 610 and/or shield 618 by a distance sufficient to absorb an anticipated impact from the displaceable object 612. As discussed above, the distance may vary depending on, among other things, a mass of the displaceable object, the nature of the protectable object (e.g., battery, passenger compartment, etc.), the anticipated speed of collision, other crash structures included in the vehicle, etc. The distance between the central portion 632 and the protected object 610 and/or shield 618 may be any of the distances described above with reference to FIGS. 4A and 4B.

The second crash structure 616 may be formed using various techniques and/or materials. For example, the second crash structure 616 may be formed from tubular or extruded material and may have a circular, square, rectangular, or other shaped cross-section. For example, the second crash structure 616 may be formed from a tubular material having a substantially rectangular cross section that substantially spans a width of the battery case 620. In some examples, the second crash structure 616 may be formed as symmetrical or asymmetrical with respect to the width and/or height of the system 600. For example, the FIG. 6B shows the second crash structure 616 as symmetrical with respect to the width of the system 600. In this example, the tubular material of the second crash structure 616 is substantially straight (e.g., has a substantially linear longitudinal length) and extends substantially parallel to a lateral direction of the vehicle.

Figure 7A:
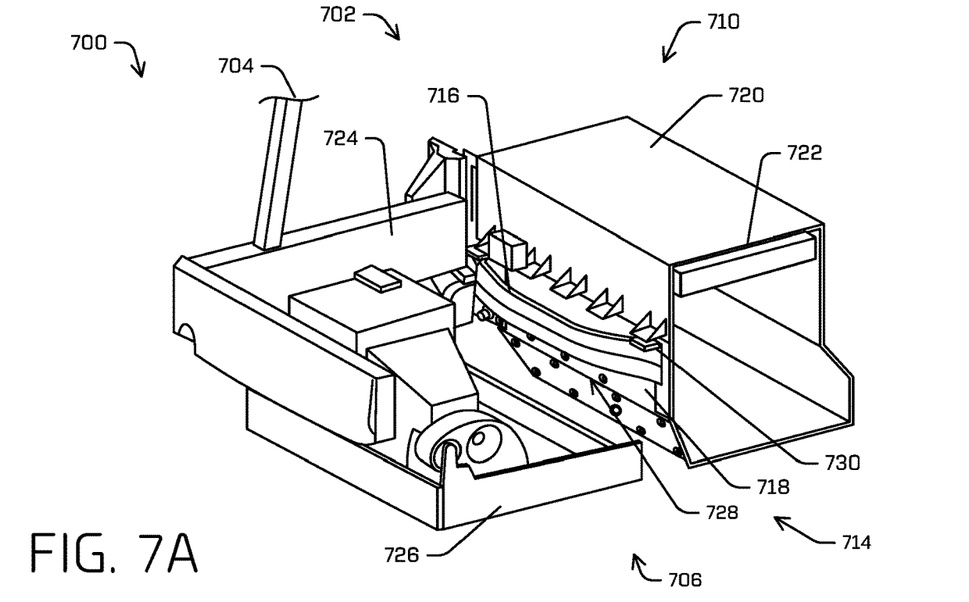
FIGS. 7A and 7B show yet another example system with impact energy absorbing structures to protect objects within a vehicle.
Figure 7B:
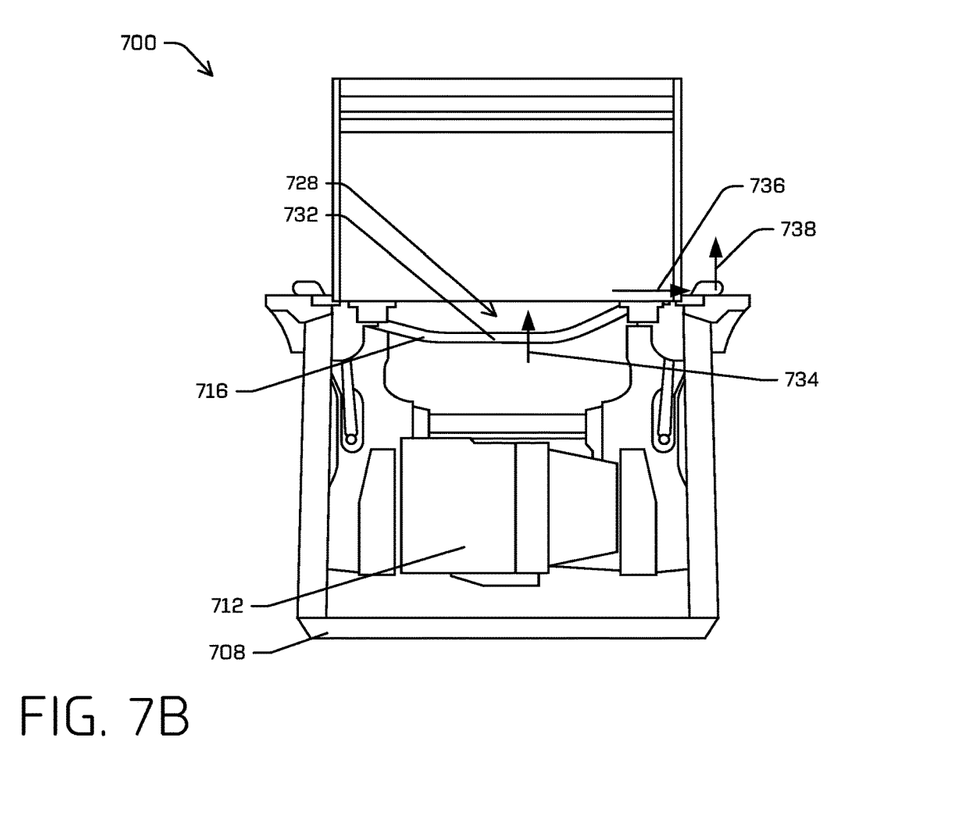

FIGS. 7A and 7B show another illustrative system 700. For example, FIG. 7A shows a perspective cutaway view of the system 700 having a drive assembly configured with impact energy absorbing structure systems to protect objects within the autonomous vehicle, in accordance with examples of the disclosure. In some examples, system 700 may share similar features and functionality as system 400.

In the illustrated example, the system 700 includes a drive assembly 702 coupled to a body 704. The drive assembly 702 in this example includes multiple vehicle systems and may include other systems and structures to protect some of those systems. For example, the drive assembly 702 includes a protection system 706. The protection system 706 includes a first crash structure 708, a protected object 710, a displaceable object 712, and an internal crash structure 714.

In some examples, the internal crash structure 714 includes a second crash structure 716, for example, a cross beam/cross member, and may include a shield 718. In some examples, the shield 718 may be attached to a battery case 720 that may hold a battery 722. In some examples, the second crash structure 716 may be coupled to the battery case 720 and/or a first frame 724 or second frame 726 of the drive assembly 702. In some examples, a portion of the second crash structure 716 is spaced a distance from the protected object 710 creating a gap 728 between the second crash structure 716 and the protected object 710.

In some examples, the drive assembly 702 includes the first frame 724 coupled to the first crash structure 708. In some examples, the first frame 724 is coupled to the protected object 710. In some examples, the first frame 724 is coupled to the internal crash structure 714. Additionally or alternatively, in some embodiments, the drive assembly 702 includes the second frame 726 coupled to the displaceable object 712. In some examples, the second frame 726 is coupled to the first frame 724. In some examples, the second frame 726 may be configured to detach and translate downward (e.g., below the first frame 724) during a collision.

In some examples, the second crash structure 716 may be coupled to the battery case 720. In this example, the second crash structure 716 is coupled to the battery case 720 at lateral edges of the second crash structure 716 with fasteners 730. In some examples, the connection between the battery case 720 and the second crash structure 716 may be configured to place a load on the fasteners 730. In other examples, the second crash structure 716 may be coupled to the battery case 720, the first frame 724, and/or other structures using other means (e.g., brackets, welding, etc.).

FIG. 7B shows a top down view of system 700. In this example, the second crash structure 716 may have a central portion 732 that is convex outward from the protected object 710 forming the gap 728 between the central portion 732 and the protected object 710.

In this example configuration, the displaceable object 712 may be displaced towards the second crash structure 716 causing second crash structure 716 to deform into the gap 728 in the direction of arrow 734. In this configuration energy from the impact with the displaceable object 712 may be transferred from the second crash structure 716 to the lateral edges of the battery case 720 and/or the first frame 724. For example, the transfer of energy may include lateral and longitudinal components in the direction of arrow 736 and arrow 738, respectively.

In some examples, the transfer of energy may be pass through the fasteners 730. In some examples, the fasteners 730 may be placed in shear, in tension, in compression, or combinations thereof, similar to the discussion above with reference to FIGS. 4A and 4B.

Additionally or alternatively, in some examples, the central portion 732 of the crash structure 716 may be spaced from the protected object 710 and/or shield 718 by a distance sufficient to absorb an anticipated impact from the displaceable object 712. As discussed above, the distance may vary depending on, among other things, a mass of the displaceable object, the nature of the protectable object (e.g., battery, passenger compartment, etc.), the anticipated speed of collision, other crash structures included in the vehicle, etc. The distance between the central portion 732 and the protected object 710 and/or shield 718 may be any of the distances described above with reference to FIGS. 4A and 4B.

The second crash structure 716 may be formed using various techniques and/or materials. For example, the second crash structure 716 may be formed from a sheet of material formed into a desired shape cross section. For example, the flat material may be stamped into the shape shown in FIGS. 7A and 7B. In some examples, the second crash structure 716 may be formed as symmetrical or asymmetrical with respect to the width and/or height of the system 700. For example, the FIG. 7B shows the second crash structure 716 as asymmetrical with respect to the width of the system 700.

Example Clauses

Any of the example clauses in this section may be used with any other of the example clauses and/or any of the other examples or embodiments described herein.

A. A vehicle comprising: a first impact energy absorbing structure disposed at a distal end of the vehicle and configured to absorb energy from an impact with an external object; a protected object internal to the vehicle; a displaceable object disposed within an internal space of the vehicle between the first impact energy absorbing structure and the protected object; and a second impact energy absorbing structure disposed within the internal space of the vehicle between the protected object and the displaceable object, the second impact energy absorbing structure configured to protect the protected object from impact by the displaceable object being displaced toward the protected object during collision.

B: The vehicle of paragraph A, further comprising a battery casing, and wherein: the protected object comprises a battery and is disposed in the battery casing; and the second impact energy absorbing structure is coupled to the battery casing, the second impact energy absorbing structure comprising a cross-member substantially spanning a width of the battery casing and configured to: deform to absorb energy of the impact with the displaceable object; and deflect the displaceable object from impacting the battery.

C: The vehicle of any one of paragraphs A or B, further comprising a drive assembly, coupled to a longitudinal end of the vehicle, wherein drive assembly includes the first impact energy absorbing structure, the protected object, the displaceable object, and the second impact energy absorbing structure.

D: The vehicle of any one of paragraph C, wherein the drive assembly is a first drive assembly and is coupled to a first longitudinal end of the vehicle, the vehicle further comprising a second drive assembly coupled to a second longitudinal end of the vehicle opposite the first longitudinal end, the second drive assembly comprising: a third impact energy absorbing structure disposed at a second distal end of a vehicle; a second protected object internal to the vehicle; a second displaceable object disposed within the internal space of the vehicle between the third impact energy absorbing structure and the second protected object; and a fourth impact energy absorbing structure disposed within the internal space of the vehicle between the second protected object and the second displaceable object, the fourth impact energy absorbing structure configured to protect the second protected object from impact by the second displaceable object being displaced toward the second protected object during collision.

E: The vehicle of any one of paragraphs A-D, wherein the second impact energy absorbing structure comprises a cross-member.

F: The vehicle of any one of paragraphs A-E, further comprising: a shield coupled to the protected object, wherein at least a portion of the shield is interposed between the second impact energy absorbing structure and the protected object.

G: The vehicle of any one of paragraphs A-F, wherein: at least a portion of the second impact energy absorbing structure is spaced a distance from the protected object creating a gap between the second impact energy absorbing structure and the protected object, and wherein the second impact energy absorbing structure is configured to deform into the gap in response to the displaceable object impacting the second impact energy absorbing structure.

H: The vehicle of any one of paragraphs AG, wherein the second impact energy absorbing structure is disposed closer to a first end of the displaceable object than to a second end of the displaceable object, such that when the displaceable object is displaced toward the protected object the second impact energy absorbing structure is positioned to contact the first end of the displaceable object to impart a torque to the displaceable object sufficient to cause the displaceable object to rotate.

I: The vehicle of any one of paragraphs A-H, wherein: the second impact energy absorbing structure is coupled to the protected object at lateral edges and is convex outward from the protected object to provide a gap between a central portion of the second impact energy absorbing structure and the protected object; and the second impact energy absorbing structure is configured to deform into the gap when impacted by the displaceable object to absorb energy of the displaceable object during collision.

J: The vehicle of paragraph I, wherein the central portion of the second impact energy absorbing structure is spaced between about 50 mm and about 150 mm from the protected object.

K: A drive assembly comprising: a first impact energy absorbing structure disposed at a distal end of the drive assembly and configured to absorb energy from an impact with an external object; a protected object internal to the drive assembly; a displaceable object disposed within an internal space of the drive assembly between the first impact energy absorbing structure and the protected object; and a second impact energy absorbing structure disposed within the internal space of the drive assembly between the protected object and the displaceable object, the second impact energy absorbing structure configured to impact the displaceable object and absorb a portion of energy from the displaceable object.

L: The drive assembly of paragraph K, further comprising a battery casing, and wherein: the protected object comprises a battery and is disposed in the battery casing; and the second impact energy absorbing structure is coupled to the battery casing, the second impact energy absorbing structure comprising a cross-member substantially spanning a width of the battery casing and configured to: deform to absorb energy of the impact with the displaceable object; and deflect the displaceable object from impacting the battery.

M: The drive assembly of any one of paragraphs K or L, further comprising: a shield coupled to the protected object; wherein at least a portion of the shield is interposed between the second impact energy absorbing structure and the protected object.

N: The drive assembly of any one of paragraphs K-M, wherein: the second impact energy absorbing structure comprises a cross-member; the cross-member protrudes towards the displaceable object creating a gap between the cross-member and the protected object; and the cross-member is configured to deform into the gap in response to the displaceable object impacting the cross-member.

O: The drive assembly of any one of paragraphs K-N, wherein the second impact energy absorbing structure is disposed closer to a first end of the displaceable object than to a second end of the displaceable object, such that when the displaceable object is displaced toward the protected object the second impact energy absorbing structure is positioned to contact the first end of the displaceable object to impart a torque to the displaceable object sufficient to cause the displaceable object to rotate.

P: The drive assembly of any one of paragraphs K-O, wherein: the second impact energy absorbing structure is coupled to the protected object at lateral edges and is convex outward from the protected object to provide a gap between a central portion of the second impact energy absorbing structure and the protected object; and the second impact energy absorbing structure is configured to deform into the gap when impacted by the displaceable object to absorb energy of the displaceable object during collision.

Q: The drive assembly of paragraph P, wherein the central portion of the second impact energy absorbing structure is spaced between about 50 mm and about 150 mm from the protected object.

R: A system comprising: a battery casing; a battery disposed in the battery casing; and an impact energy absorbing structure coupled to the battery casing, the impact energy absorbing structure comprising a cross-member substantially spanning a width of the battery casing and configured to: deform to absorb energy of an object impacting the system; and deflect the object from impacting the battery.

S: The system of paragraph R, further comprising: a shield coupled to the battery casing, wherein at least a portion of the shield is interposed between the cross-member and the battery.

T: The system of any one of paragraphs R or S, wherein: lateral edges of the cross-member are coupled to the battery casing; the cross-member is convex outward from the battery casing to provide a gap between a central portion of the cross-member and the battery casing; and the cross-member is configured to deform into the gap when impacted by the object to absorb energy of the object during collision.

While the example clauses described above are described with respect to one particular implementation, it should be understood that, in the context of this document, the content of the example clauses may also be implemented via a method, device, system, a computer-readable medium, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A vehicle comprising:
    a first crash structure disposed at a distal end of the vehicle and configured to absorb energy from an impact with an external object;
    a protected object internal to the vehicle;
    a displaceable object disposed within an internal space of the vehicle between the first crash structure and the protected object; and
    a second crash structure disposed within the internal space of the vehicle between the protected object and the displaceable object, the second crash structure configured to protect the protected object from impact by the displaceable object being displaced toward the protected object during collision.

2. The vehicle of claim 1, further comprising a battery casing, and wherein:
    the protected object comprises a battery and is disposed in the battery casing; and
    the second crash structure is coupled to the battery casing, the second crash structure comprising a cross-member substantially spanning a width of the battery casing and configured to:

deform to absorb energy of the impact with the displaceable object; and deflect the displaceable object from impacting the battery.

3. The vehicle of claim 1, further comprising a drive assembly, coupled to a longitudinal end of the vehicle, wherein drive assembly includes the first crash structure, the protected object, the displaceable object, and the second crash structure.

4. The vehicle of claim 3, wherein the drive assembly is a first drive assembly and is coupled to a first longitudinal end of the vehicle, the vehicle further comprising a second drive assembly coupled to a second longitudinal end of the vehicle opposite the first longitudinal end, the second drive assembly comprising:

a third crash structure disposed at a second distal end of a vehicle;

a second protected object internal to the vehicle;

a second displaceable object disposed within the internal space of the vehicle between the third crash structure and the second protected object; and a fourth crash structure disposed within the internal space of the vehicle between the second protected object and the second displaceable object, the fourth crash structure configured to protect the second protected object from impact by the second displaceable object being displaced toward the second protected object during collision.

5. The vehicle of claim 1, wherein the second crash structure comprises a cross-member.

6. The vehicle of claim 5, further comprising:

a shield coupled to the protected object, wherein at least a portion of the shield is interposed between the second crash structure and the protected object.

7. The vehicle of claim 1, wherein:

at least a portion of the second crash structure is spaced a distance from the protected object creating a gap between the second crash structure and the protected object, and wherein the second crash structure is configured to deform into the gap in response to the displaceable object impacting the second crash structure.

8. The vehicle of claim 1, wherein the second crash structure is disposed closer to a first end of the displaceable object than to a second end of the displaceable object, such that when the displaceable object is displaced toward the protected object the second crash structure is positioned to contact the first end of the displaceable object to impart a torque to the displaceable object sufficient to cause the displaceable object to rotate.

9. The vehicle of claim 1, wherein:

the second crash structure is coupled to the protected object at lateral edges and is convex outward from the protected object to provide a gap between a central portion of the second crash structure and the protected object; and the second crash structure is configured to deform into the gap when impacted by the displaceable object to absorb energy of the displaceable object during collision.

10. The vehicle of claim 9, wherein the central portion of the second crash structure is spaced between about 50 mm and about 150 mm from the protected object.

11. A drive assembly for a vehicle, the drive assembly comprising:

a first crash structure disposed at a distal end of the drive assembly and configured to absorb energy from an impact with an external object;

a protected object internal to the drive assembly;

a displaceable object disposed within an internal space of the drive assembly between the first crash structure and the protected object; and a second crash structure disposed within the internal space of the drive assembly between the protected object and the displaceable object, the second crash structure configured to impact the displaceable object and absorb a portion of energy from the displaceable object.

12. The drive assembly of claim 11, further comprising a battery casing, and wherein:

the protected object comprises a battery and is disposed in the battery casing; and the second crash structure is coupled to the battery casing, the second crash structure comprising a cross-member substantially spanning a width of the battery casing and configured to:

deform to absorb energy of the impact with the displaceable object; and deflect the displaceable object from impacting the battery.

13. The drive assembly of claim 11, further comprising:

a shield coupled to the protected object;

wherein at least a portion of the shield is interposed between the second crash structure and the protected object.

14. The drive assembly of claim 11, wherein:

the second crash structure comprises a cross-member;

the cross-member protrudes towards the displaceable object creating a gap between the cross-member and the protected object; and the cross-member is configured to deform into the gap in response to the displaceable object impacting the cross-member.

15. The drive assembly of claim 11, wherein the second crash structure is disposed closer to a first end of the displaceable object than to a second end of the displaceable object, such that when the displaceable object is displaced toward the protected object the second crash structure is positioned to contact the first end of the displaceable object to impart a torque to the displaceable object sufficient to cause the displaceable object to rotate.

16. The drive assembly of claim 11, wherein:

the second crash structure is coupled to the protected object at lateral edges and is convex outward from the protected object to provide a gap between a central portion of the second crash structure and the protected object; and the second crash structure is configured to deform into the gap when impacted by the displaceable object to absorb energy of the displaceable object during collision.

17. The drive assembly of claim 16, wherein the central portion of the second crash structure is spaced between about 50 mm and about 150 mm from the protected object.

18. The vehicle of claim 1, wherein the first crash structure comprises a bumper or other impact energy absorbing structure.

19. The drive assembly of claim 11, wherein the second crash structure is symmetrical with respect to a width of the drive assembly.

20. The drive assembly of claim 11, wherein the second crash structure is asymmetrical with respect to a width of the drive assembly.

* * * * *